Aug. 16, 1955          A. A. DICKE          2,715,669
ELECTRIC SOLDERING TOOL
Filed Jan. 29, 1951          2 Sheets-Sheet 1
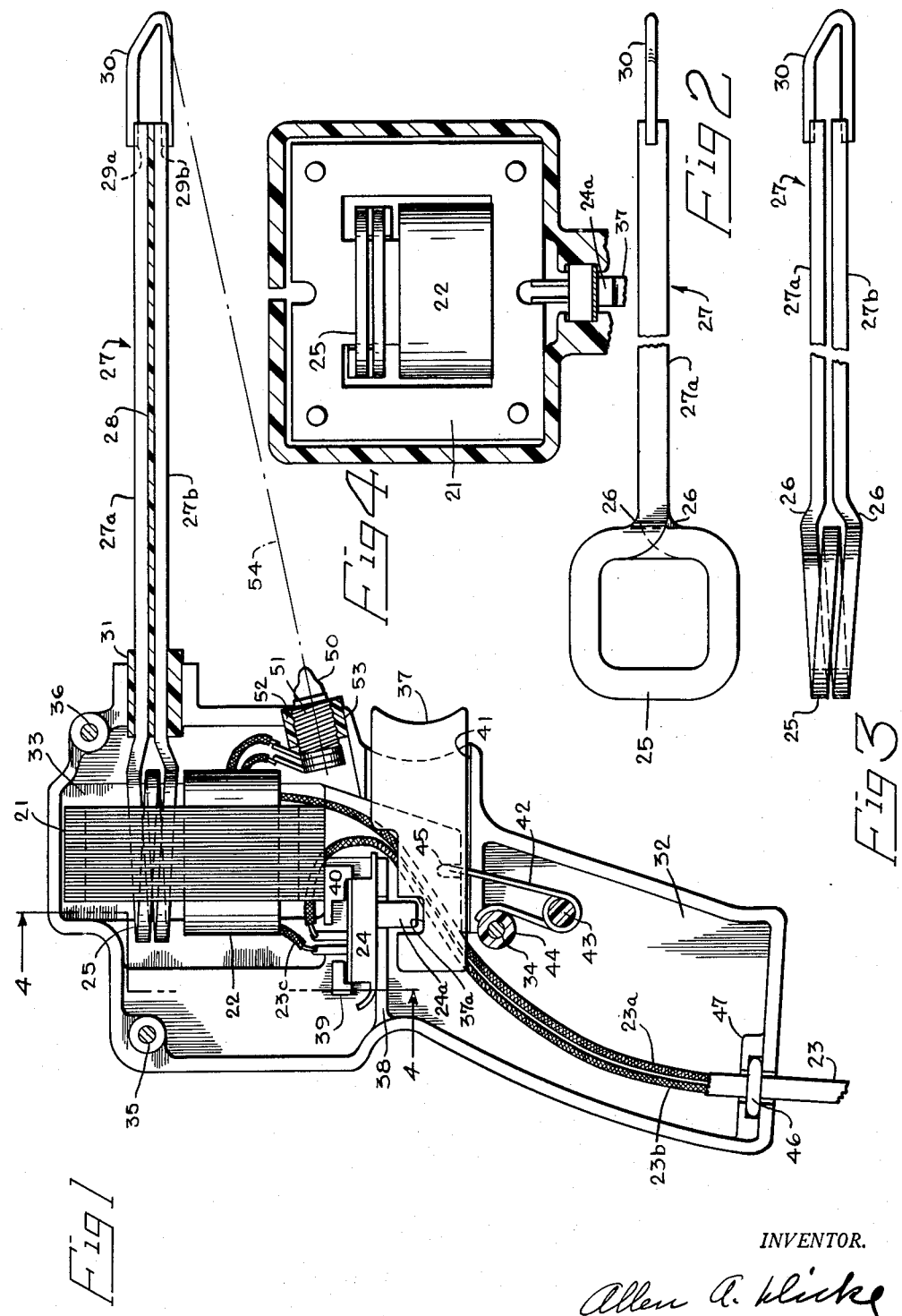
INVENTOR.
Allen A. Dicke Aug. 16, 1955  A. A. DICKE  2,715,669
ELECTRIC SOLDERING TOOL
Filed Jan. 29, 1951  2 Sheets-Sheet 2
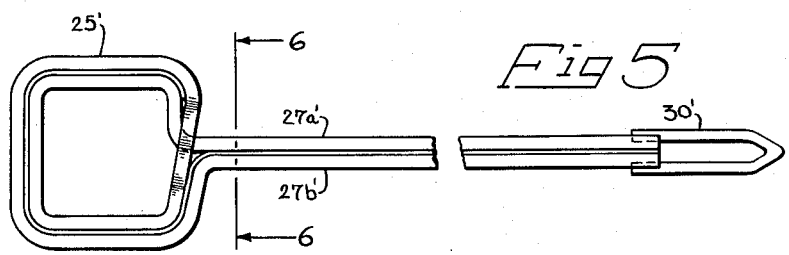
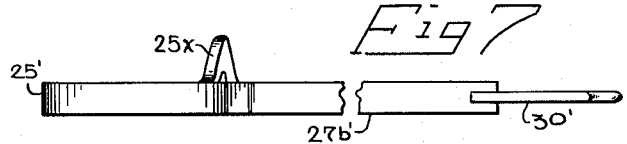
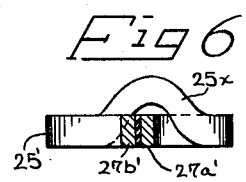
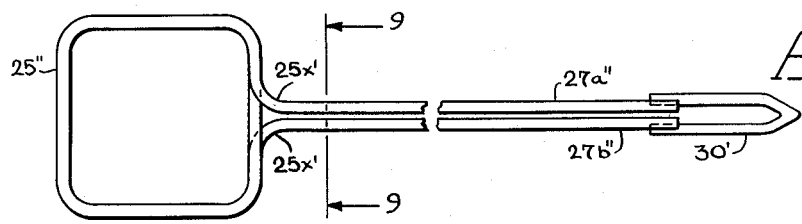
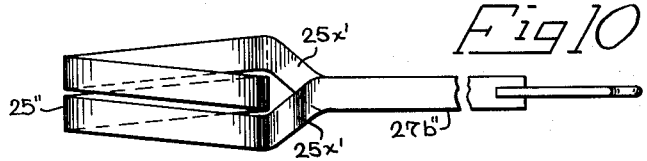
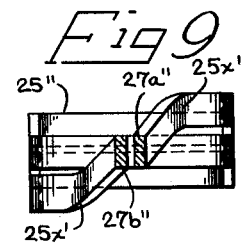
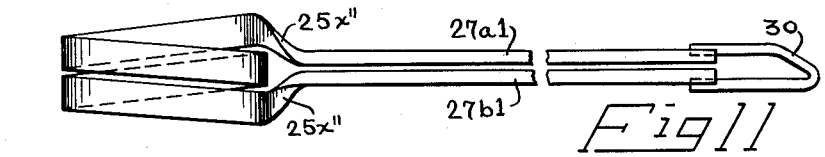
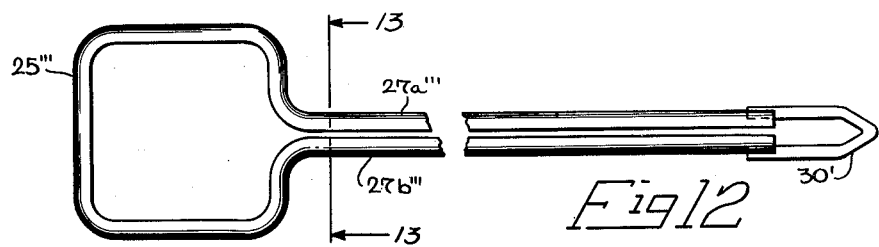
INVENTOR.
Allen A. Dicke
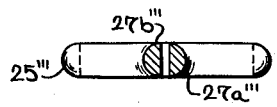

United States Patent Office 2,715,669
Patented Aug. 16, 1955

2,715,669

ELECTRIC SOLDERING TOOL

Allen A. Dicke, Montclair, N. J.

Application January 29, 1951, Serial No. 208,370

11 Claims. (Cl. 219—26)

This invention relates to improvements in an electric soldering tool and has for an object the provision of such a hand tool including a transformer for transforming alternating current of relatively high voltage and low amperage to current of extremely low voltage and extremely high amperage.

Another object is to provide such a tool comprising a laminated field, a primary winding thereon and a secondary thereon consisting of copper or the equivalent including one or more turns on said field, and a working finger consisting of two closely adjacent complementary parts of low resistivity and large cross-section insulated from each other, said secondary and said working finger parts being formed of one continuous bar of copper or the like; the ends of the working finger parts being connected respectively with the ends of a soldering tip of U-formation preferably made of wire connected to the ends of the working finger parts by soldering.

Another object is to provide such a device having a unitary secondary and working finger having a rectangular cross-section, the width being substantially double the thickness so that the portions thereof comprising the working finger lie close together and form a substantially square combined cross-section.

Another object is to provide such a secondary in which the rectangular bar is bent edgewise to form one or more turns comprising the secondary proper and then again bent edgewise to form the working finger consisting of extensions of said bar overlying each other with their wider faces in contiguity.

Another object is to provide such a secondary in which the rectangular bar is bent flatwise to form one or more turns comprising the secondary proper, and then again bent flatwise to form the working finger consisting of extensions of said bar overlying each other with their wider faces in contiguity.

Another object is to provide such a device having a unitary secondary and working finger having a semi-circular cross-section so that the portions thereof comprising the working finger lie close together and form a substantially circular combined cross-section.

Another object is to provide such a tool having a secondary and a working finger, the ends of the working finger parts being formed with depressions in which lie at least a part of the ends of the U-shaped working tip whereby the soldering of the working tip to the working finger is facilitated.

Another object is to provide such a tool provided with a lamp for illuminating the work, said lamp being located some distance from the working finger and being inclined in a vertical plane so that the axis of the lamp will substantially intersect the end of the working tip.

Another object is to provide such a tool comprising a housing consisting of two halves, each half being formed with a generally hemi-cylindrical recess within which the lamp socket is received and clamped in place.

Another object is to provide such a tool including a transformer field of the core type arranged transversely of the tool with its winding receiving leg extending vertically whereby the working finger parts may extend directly away from the secondary in the longitudinal central vertical plane of the tool.

Another object is to provide such a tool including a switch of standard construction, the housing parts being formed with sockets to receive and hold the switch.

Another object is to provide such a tool including such a switch and a trigger slide for operating said switch, said slide being received in and guided by slide ways formed in the housing parts and said trigger slide being formed with a recess to receive the finger piece of said switch, a spring being provided to urge the trigger slide outwardly whereby the outward movement of said trigger slide is limited by the finger piece of said switch.

Further objects and advantages of this invention will be apparent from consideration of the specification as illustrated by the accompanying drawings of possible embodiments of the invention, in which drawings:

Fig. 1 is a side elevation of one form of tool made in accordance with the invention, the right housing section having been removed so that the left cover section, the laminated field, parts of the primary coil, parts of the secondary, the working finger and the working tip, the lamp socket, the lamp bulb, the switch, the trigger slide, the trigger spring, and the supply conductors are shown in side elevation;

Fig. 2 is a plan view of the secondary, working finger and working tip shown in Fig. 1;

Fig. 3 is a side view of the secondary, working finger and tip shown in Fig. 2;

Fig. 4 is a cross section taken along the line 4—4 of Fig. 1, looking in the direction of the arrows;

Fig. 5 is a plan view of a modified form of secondary, working finger and working tip formed of rectangular bar material bent flatwise;

Fig. 6 is a cross-section taken on the line 6—6 of Fig. 5;

Fig. 7 is a side view of the parts shown in Fig. 5;

Fig. 8 shows a modified form of secondary, working finger and tip, the secondary and working finger consisting of rectangular bar material bent flatwise;

Fig. 9 is a cross-section taken on the line 9—9 of Fig. 8;

Fig. 10 is a side view of the parts shown in Fig. 8;

Fig. 11 shows another modified form of secondary and working finger;

Fig. 12 shows a form of secondary, working finger and working tip, the secondary and working finger being formed of substantially semi-circular bar material;

Fig. 13 is a cross-section on the line 13—13 of Fig. 12.

Referring to said drawings, the tool is preferably of pistol type, viz., is formed with a handle and a switch operating trigger located at the front of the upper part of the handle for convenient operation by the index finger. In the form shown, a shell type laminated field is used made up of E and I laminations, the field being generally designated 21. Surrounding the center leg of said field is the primary coil 22 energized by alternating current supplied through duplex conductor 23 consisting of conductor 23a leading directly to the primary coil, and conductor 23b leading to the switch 24 and thence to the primary coil through conductor 23c. Also surrounding the center leg of the field is the secondary 25 shown in Figs. 1 through 4 as consisting of two turns of rectangular copper bar material bent edgewise as shown. Said bar has reverse bends 26 so formed as to provide extensions of the bar material to form the complemental extensions 27a and 27b which overlie each other in contiguity to form the working finger 27, the two sections being separated by a thin strip of insulating material 28. At their outer ends the working finger parts 27a and 27b are formed with recesses 29a and 29b, respectively, which recesses receive the ends of the working tip 30 which consists of a wire formed into a U-shape. Due to the low voltage available in the secondary (approximately ½ volt) it is desirable to solder the connections of the working tip to the working finger parts. Ordinary soft solder may be used since the temperature reached at that point is never above the melting point of solder.

It will be noted that since the width of the bar material is substantially twice its thickness, the resulting working finger 27 is of substantially square cross-section. The working finger is preferably surrounded by a tube 31 of insulating material of square cross-section at the point where the working finger passes through the housing.

The housing, preferably of insulating material, is made up of two similar halves, only one of which is shown in Fig. 1. Each half consists of a hollow handle portion 32 and an enlarged transformer receiving portion 33. The two halves are clamped together by means of three screws or bolts 34, 35 and 36 so that when assembled the transformer field is firmly held in place therebetween.

The switch 24 is preferably a standard commercial slide switch having a finger piece 24a received in a recess 37a in a switch operating trigger 37. The switch is held in place in recesses formed in the housing halves, said recesses being bounded by lower shelves 38 and upper lugs 39 and 40. Thus the switch body is clamped in position against movement in any direction. The trigger slide 37 is likewise guided in recesses 41 in the housing halves and is normally held in the forward position by means of a torsion spring 42 wrapped around a stud 43 formed in the left housing half and having its abutment against the stud 44 which also receives the clamp screw or bolt 34. The upper end of spring 42 extends into a perforation or recess 45 in the trigger slide.

The supply conductor 23 is preferably provided with a strain reliever 46 clamped thereon, said reliever being received in recesses 47 in the housing halves.

The lamp 50 is preferably of the type formed with a lens at its end to concentrate the light in a narrow beam. It is shown as of the screw base type. The socket 51 is shown surrounded by an insulating sleeve 52 which is clamped in semicylindrical recess 53 formed in the forward walls of the housing halves. It will be noted that the axis of said recess is inclined upwardly so that the light beam will be concentrated near the end of the working tip 30 as indicated by the dotted line 54. The lamp is energized through conductors tapped from the primary 22 or by a separate winding on the center leg to provide the desired voltage for proper operation of the lamp.

In use the operator grasps the tool by the handle 32 and pulls the switch operating slide trigger 37 rearwardly. This closes switch 24 and completes the circuit through the primary 22. This immediately energizes lamp 50 and causes a low voltage, high amperage current to flow in the secondary 25 and through the working finger parts 27a and 27b and through the working tip 30. The working tip is preferably made of a material having a much higher electrical resistivity than copper of which the secondary and working finger parts are made. For this reason and because of its smaller cross-section, practically all of the heat will be developed in the working tip with the result that the working tip will in three or four seconds reach soldering temperature. Since only about 5% of the heat developed is generated in the secondary and working finger parts, these parts do not attain a high temperature even after long continuous use. This is important as the primary coil is closely adjacent to the secondary and the windings thereof might be destroyed by high temperature in the secondary.

The working tip 30 may be made of any desirable material which is wettable by solder, has a resistivity preferably higher than copper and also preferably has a high positive resistance temperature coefficient. Included among the alloys suitable for the purpose are the following:

| No. | Cu | Ni | Si | Fe | Mn | Resistivity times Cu |
|---|---|---|---|---|---|---|
| 1 | 50 | 50 | | | | 29 |
| 2 | 70 | 30 | | | | 21.7 |
| 3 | 80 | 20 | | | | 15.5 |
| 4 | 97 | | 3 | | | 14.3 |
| 5 | | 72 | | 28 | | |
| 6 | 30 | 67 | | 1.4 | 1 | 28 |

Figs. 5, 6 and 7 show a modified form in which the secondary 25' and the working finger parts 27a' and 27b' are again formed of rectangular material whose width is approximately double its thickness. However, the bar material is bent flatwise and the turns of the secondary lie substantially in the same plane instead of being helically arranged as in Figs. 1 through 4. With this form of construction, it is necessary to form one part of the secondary with a hump 25x to bridge over the inner winding as is shown most clearly in Figs. 6 and 7. In this form, the working tip 30' will lie in the horizontal plane instead of the vertical plane as in the form of Figs. 1 through 4.

Figs. 8, 9 and 10 show a secondary 25" with which are formed integrally the working finger parts 27a" and 27b". Since such a secondary requires a small amount of space laterally, the secondary preferably surrounds the primary 22 which may now extend the full length of the center leg instead of only part of said length as in Figs. 1 through 4. In this form the working tip 30" is shown as lying in the horizontal plane. The secondary consists of two turns helically arranged, the ends being twisted as shown at 25x' to bring the working finger parts 27a" and 27b" into contiguity.

Fig. 11 shows a construction similar to Figs. 8–10 with the difference that the twist 25x" is so made that the working finger parts 27a1 and 27b1 are superposed so that the working tip 30 lies in the vertical plane.

Figs. 12 and 13 show another modified form in which the secondary 25''' and the working finger parts 27a''' and 27b''' are formed of semi-cylindrical rod material. In the form shown, the secondary is of the single turn type so that the parts lie in the same plane. In this case the working tip 30' lies in the horizontal plane. The use of semi-cylindrical rod material results in a working finger of a substantially cylindrical construction which is very desirable from the standpoint of appearance.

It is, of course, to be understood that semi-cylindrical rod material may be used in the forms shown in Figs. 1 through 11 instead of the rectangular bar material thereshown.

By locating the field transversely as shown in the drawings, it is possible to make use of standard EI laminations as the working finger may extend at right angles to the plane of the field. By arranging the field with its center leg vertical, it is possible to have the working finger located in the central vertical plane, which is essential for a proper appearance, and at the same time, have the working finger near the top of the tool which is important from the standpoint of similarity to standard pistols and convenience in reaching the work to be soldered.

It will be noted that the constructions shown and described will serve admirably to accomplish the objects stated above. It is to be understood, however, that the constructions disclosed above are intended merely as illustrative of the invention and not as limiting as various other modifications therein may be made without departing from the invention as defined by a proper interpretation of the claims which follow.

I claim:

1. An electrical soldering tool comprising a primary winding and a secondary winding, a magnetic field member passing through both of said windings, said secondary winding being part of a combined secondary winding and working finger consisting of one continuous bar of highly conductive material having at least one flat side, the secondary winding portion consisting of at least one turn of said bar material surrounding said field member and said working finger portion comprising two complementary closely adjacent, mutually supporting, highly conductive finger parts electrically insulated from each other and comprising an integral continuation of said bar, the flat side of the bar forming the flat sides of said working fingers, which flat sides lie adjacent and parallel to each other, said parts being so formed that said secondary winding has its axis extending substantially at right angles to the axis of the working finger, and a U-shaped soldering tip electrically connected to the other ends of said finger parts.

2. An electrical soldering tool comprising a primary winding and a secondary winding, a magnetic field member passing through both of said windings, said secondary winding being part of a combined secondary winding and working finger consisting of one rectangular bar of highly conductive material, the secondary winding portion consisting of at least one turn of said bar material surrounding said field member and said working finger portion comprising extensions of said bar so formed as to provide two complementary finger parts with their flat sides in contiguity and electrically insulated from each other, said parts being so formed that said secondary winding has its axis extending substantially at right angles to the axis of the working finger, and a U-shaped soldering tip electrically connected to the other ends of said finger parts.

3. An electrical soldering tool comprising a primary winding and a secondary winding, a magnetic field member passing through both of said windings, said secondary winding being part of a combined secondary winding and working finger consisting of one rectangular bar of highly conductive material, the secondary winding portion consisting of plural helical turns of said bar material surrounding said field member and said working finger portion comprising extensions of said bar so formed as to provide two complementary finger parts with their flat sides in contiguity and electrically insulated from each other, said parts being so formed that said secondary winding has its axis extending substantially at right angles to the axis of the working finger, and a U-shaped soldering tip electrically connected to the other ends of said finger parts.

4. An electrical soldering tool comprising a primary winding and a secondary winding, a magnetic field member passing through both of said windings, said secondary winding being part of a combined secondary winding and working finger consisting of one rectangular bar of highly conductive material, the secondary winding portion consisting of plural helical turns of said bar material surrounding said field member formed by bending said rectangular bar material edgewise and said working finger portion comprising extensions of said bar so formed as to provide two complementary finger parts with their flat sides in contiguity and electrically insulated from each other, said parts being so formed that said secondary winding has its axis extending substantially at right angles to the axis of the working finger, and a U-shaped soldering tip electrically connected to the other ends of said finger parts.

5. An electric soldering tool comprising a primary winding and a secondary winding, a magnetic field member passing through both of said windings, said secondary winding being part of a combined secondary winding and working finger consisting of one rectangular bar of highly conductive material, the secondary winding portion consisting of at least one turn of said bar material surrounding said field member formed by bending said rectangular bar material edgewise and said working finger portion comprising extensions of said bar so formed as to provide two complementary finger parts with their flat sides in contiguity and electrically insulated from each other, said parts being so formed that said secondary winding has its axis extending substantially at right angles to the axis of the working finger, and a U-shaped soldering tip electrically connected to the other ends of said finger parts.

6. An electrical soldering tool comprising a primary winding and a secondary winding, a magnetic field member passing through both of said windings, said secondary winding being part of a combined secondary winding and working finger consisting of one rectangular bar of highly conductive material, the secondary winding portion consisting of at least one turn of said bar material surrounding said field member and formed by bending said rectangular material edgewise and said working finger portion comprising extensions of said bar so formed as to provide two complementary finger parts with their flat sides parallel to the flat sides of said secondary turns and in contiguity and electrically insulated from each other, said parts being so formed that said secondary winding has its axis extending substantially at right angles to the axis of the working finger, and a U-shaped soldering tip electrically connected to the other ends of said finger parts.

7. An electrical soldering tool comprising a primary winding and a secondary winding, a magnetic field member passing through both of said windings, said secondary winding being part of a combined secondary winding and working finger consisting of one rectangular bar of highly conductive material, the secondary winding portion consisting of at least one turn of said bar material surrounding said field member and formed by bending said rectangular material flatwise and said working finger portion comprising extensions of said bar so formed as to provide two complementary finger parts with their flat sides parallel to the flat sides of said secondary portion, in contiguity and electrically insulated from each other, said parts being so formed that said secondary winding has its axis extending substantially at right angles to the axis of the working finger, and a U-shaped soldering tip electrically connected to the other ends of said finger parts.

8. An electrical soldering tool comprising a primary winding and a secondary winding, a magnetic field member passing through both of said windings, said secondary winding being part of a combined secondary winding and working finger consisting of one rectangular bar of highly conductive material, the secondary winding portion consisting of at least one turn of said bar material surrounding said field member and formed by bending said bar material flatwise and said working finger portion comprising extensions of said bar so formed as to provide two complementary finger parts with their flat sides in contiguity and electrically insulated from each other, said finger portions being so twisted that their flat sides are parallel to the edges of the secondary portion, said parts being so formed that said secondary winding has its axis extending substantially at right angles to the axis of the working finger, and a U-shaped soldering tip electrically connected to the other ends of said finger parts.

9. An electrical soldering tool comprising a magnetic field of the shell type, a primary winding and a secondary winding located on the center leg of said field, said secondary winding being part of a combined secondary winding and working finger consisting of a single bar of highly conductive material having at least one flat side, the secondary winding portion consisting of at least one turn of said bar material surrounding the center leg of said field member and said working finger portion comprising extensions of said bar so formed as to provide two complementary finger parts located in contiguity with their flat sides facing each other and electrically insulated from each other, the flat side of said bar forming the flat sides of said working finger parts, said parts being so formed that said secondary winding has its axis extending substantially at right angles to the axis of the working finger, and a U-shaped soldering tip electrically connected to the other ends of said finger parts.

10. The combination according to claim 9 together with a housing enclosing said field, said primary winding, said secondary winding and part of said working finger portion, the plane of said field extending transversely to said working finger.

11. The combination according to claim 9 together with a housing enclosing said field, said primary winding, said secondary winding and part of said working finger portion, the plane of said field extending transversely to said working finger and said center leg extending vertically.

References Cited in the file of this patent

UNITED STATES PATENTS

| | | |
|---|---|---|
| 1,684,143 | Pieper et al. | Sept. 11, 1928 |
| 2,397,348 | Haines et al. | Mar. 26, 1946 |
| 2,405,866 | Weller | Aug. 13, 1946 |
| 2,491,931 | Raker et al. | Dec. 20, 1949 |
| 2,570,762 | Caliri | Oct. 9, 1951 |
| 2,593,947 | Weller | Apr. 22, 1952 |

FOREIGN PATENTS

| | | |
|---|---|---|
| 787,065 | France | Sept. 16, 1935 |
| 838,748 | France | Mar. 14, 1939 |
| 893,094 | France | May 30, 1944 |